April 8, 1924.
E. C. CRITCHLOW
COUPLING FOR LUBRICATING SYSTEMS
Filed Jan. 27, 1921
1,489,310
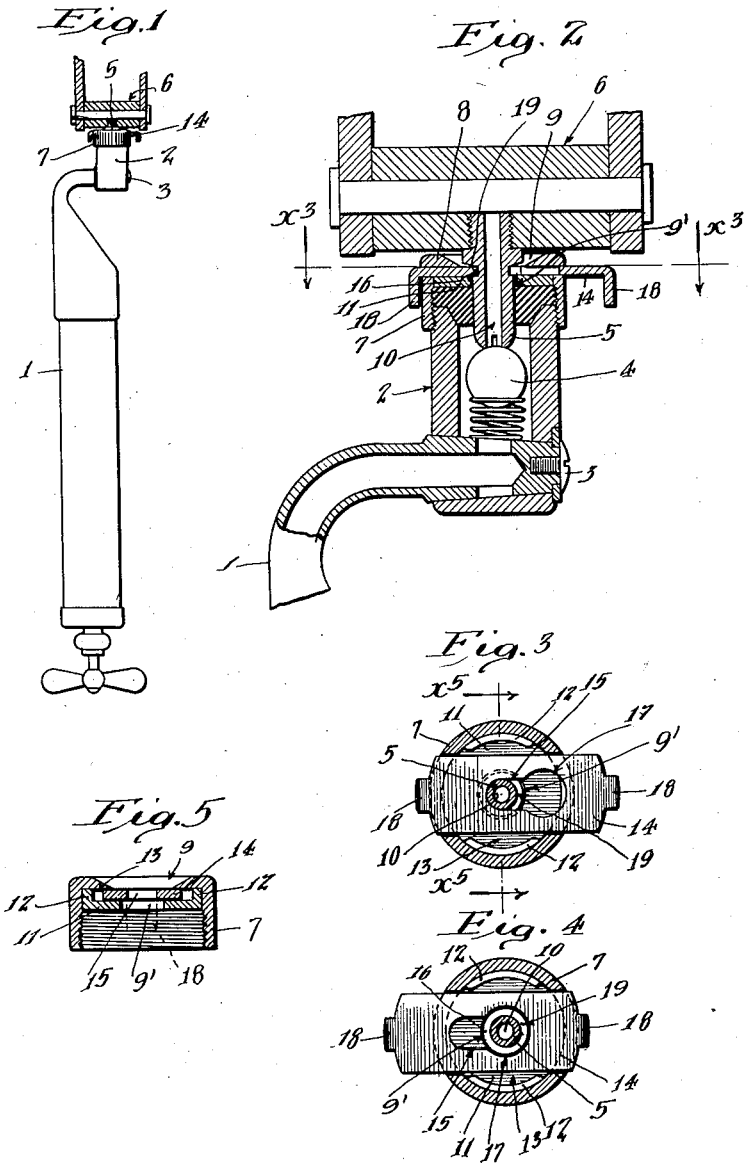

Patented Apr. 8, 1924.

1,489,310

UNITED STATES PATENT OFFICE.

EDWARD COE CRITCHLOW, OF ORCUTT, CALIFORNIA.

COUPLING FOR LUBRICATING SYSTEMS.

Application filed January 27, 1921. Serial No. 440,312.

*To all whom it may concern:*

Be it known that I, EDWARD COE CRITCHLOW, a citizen of the United States, and a resident of Orcutt, in the county of Santa Barbara and State of California, have invented certain new and useful Improvements in Couplings for Lubricating Systems, of which the following is a specification.

This invention relates to a coupling for connecting the nozzle of a lubricant gun to the part which is to receive the lubricant, and an object of the invention is to produce a coupling that will stand up under the strains produced by the relatively high pressures in the system when the lubricant is being forced into the bearing being lubricated.

Another object is to provide a coupling which can be quickly placed in coupling position, and can as readily be disconnected.

This invention is an improvement over that disclosed in my co-pending application Serial No. 364,118, filed March 8, 1920. In the device disclosed in the said co-pending application the latch is pivoted on the outer end of the nozzle and in the course of time it is apt to become bent by the relatively high pressure of lubricant in the nozzle tending to force the nozzle off of the nipple. To provide greater strength in the connection, I employ a latch which slides in a way provided for it in the nozzle, the head or end wall of the nozzle preventing the latch from being bent outward when pressure is developed in the nozzle tending to push the nozzle from the nipple.

The accompanying drawings illustrate the invention:

Figure 1 is a side elevation of a lubrication system in which the improved coupling is employed, a bearing, to which the system is attached, being shown in section.

Figure 2 is an enlarged sectional elevation of the parts shown in the upper portion of Figure 1, the latch being in nipple-engaging position.

Figure 3 is a plan section on the line indicated by $x^3$—$x^3$, Figure 2.

Figure 4 is a plan section similar to Figure 3, excepting that the latch is shown in nipple-releasing position.

Figure 5 is a sectional elevation of the cap and latch on the line indicated by $x^5$—$x^5$, Figure 3.

In Figure 1 is shown a lubricant gun 1 and a valved discharge nozzle 2 swiveled at 3 to the gun. The construction of the nozzle valve, indicated at 4, is immaterial as regards this invention, it sufficing to state that, as shown in Figure 2, the valve is spring-closed and is opened by forcing thereagainst a nipple 5 which is screw-threaded into or otherwise attached to the part to be lubricated, such part being shown in this instance as a bearing 6. The nozzle has a detachable cap 7 which forms an end wall 8 for the nozzle and this end wall is provided with an orifice 9 through which the nipple 5 extends when the nozzle is in position on the nipple for opening the valve 4 to permit lubricant to flow into the bore 10 of the nipple.

The cap 7 is provided with a secondary or inner end wall 11 provided with flanges 12 which seat against the inner face of the wall 8 so as to space the wall 11 from the wall 8 to produce a way 13 in which slides a latch 14 adjacent the inner face of the wall 8. The wall 11 is provided with an orifice 9' in axial alinement with the orifice 9. The latch 14 is provided with a slot comprising a contracted portion 15 adapted to seat against an annular shoulder 16 on the nipple when the latch is moved into the position shown in Figures 1 and 2. The slot in the latch 14 also comprises an expanded portion 17 of sufficient width to permit the nozzle to be applied to and withdrawn from the nipple when the latch is in the position shown in Figure 4. The latch 14 is provided at opposite ends thereof with abutments 18 adapted to prevent the latch from becoming detached from the cap and affording means whereby the latch may be easily manipulated.

The shoulder 16 constitutes one wall of an annular groove 19 in the peripheral face of the nipple 5, said groove being sufficiently wide to accommodate the marginal portions of the contracted portion 15 of the slot.

From the foregoing, it is readily seen that when the latch 14 is in the position shown in Figure 4 the nozzle may be readily slipped onto the nipple 5 and that the latch will then be moved to the position shown in Figures 2 and 3 so as to engage the shoulder 16, thus preventing the nozzle from slipping off of the nipple when pressure of the lubricant against the nipple is developed within the nozzle. When such pressure is developed the end wall 8 prevents the latch from being bent outwardly. To detach the nozzle from the nipple the operations above described will be reversed.

I claim as my invention:

A lubricator having a lubricant containing portion and a discharge conduit extending therefrom comprising a plurality of angularly swiveled rigid sections, the outermost section having a cap with a way therein, a latch slidable in the way and provided with a slot having a contracted portion and an expanded portion, and a valve in said outermost section adapted to be opened on coming in contact with the part to be lubricated when the latch is locked upon said part.

Signed at Santa Maria, Cal., this 19 day of January, 1921.

EDWARD COE CRITCHLOW.

Witnesses:
J. M. DAVIS,
EDITH JESSEE.